United States Patent [19]

Deguchi

[11] Patent Number: 4,569,786

[45] Date of Patent: Feb. 11, 1986

[54] ELECTRICALLY CONDUCTIVE THERMOPLASTIC RESIN COMPOSITION CONTAINING METAL AND CARBON FIBERS

[75] Inventor: Ryuichi Deguchi, Ube, Japan

[73] Assignee: Ube Industries, Ltd., Yamaguchi, Japan

[21] Appl. No.: 597,605

[22] Filed: Apr. 6, 1984

[30] Foreign Application Priority Data

Apr. 12, 1983 [JP] Japan .................................. 58-63007

[51] Int. Cl.$^4$ ............................ C08L 7/02; H01B 1/20
[52] U.S. Cl. ..................................... 252/503; 252/511; 252/512; 252/513; 524/439; 524/440; 524/441; 524/495; 524/496; 528/485; 528/490
[58] Field of Search ............... 252/503, 511, 512, 513; 524/439–441, 495, 496; 528/485, 490

[56] References Cited

U.S. PATENT DOCUMENTS 4,404,125  9/1983  Abolins et al. ...................... 252/512
4,508,640  4/1985  Kanda et al. ........................ 252/511

OTHER PUBLICATIONS

"Molded Composites as EMI Shields" Battelle Laboratories, Bigg et al., pp. 103–105; 7-79.

Primary Examiner—A. Lionel Clingman
Attorney, Agent, or Firm—Finnegan, Henderson, Farabow, Garrett & Dunner

[57] ABSTRACT

An electrically conductive thermoplastic resin composition having a high electrical conductivity and a relatively low specific gravity is obtained by evenly dispersing 2% by volume or more of metallic fibers and 2% by volume or more carbon fibers in a thermoplastic resin matrix, the sum of the amounts of the metallic and carbon fibers being from 8% to 20% by volume.

4 Claims, No Drawings

ELECTRICALLY CONDUCTIVE THERMOPLASTIC RESIN COMPOSITION CONTAINING METAL AND CARBON FIBERS

BACKGROUND OF THE INVENTION

(1) Field of the Invention

The present invention relates to an electrically conductive thermoplastic resin composition. More particularly, the present invention relates to an electrically conductive thermoplastic resin composition containing a relatively small amount of electrically conductive fillers evenly dispersed in a thermoplastic resin matrix, and having a satisfactory electrical conductivity.

(2) Description of Prior Art

It is well known that the electrical conductivity of a thermoplastic resin can be increased by mixing an electrically conductive filler, for example, graphite powder, carbon black powder, carbon fibers, or metallic fibers, into a thermoplastic resin. In the known electrically conductive fillers, graphite powder, carbon black powder, and carbon fibers have a relatively low specific gravity and exhibit a lower electrical conductivity than the metallic fibers. Therefore, to obtain a satisfactory electrical conductivity by using one of the above-mentioned carbonous fillers, it is necessary to mix a relatively large amount of the carbonous filler into the thermoplastic resin. This necessity causes the resultant thermoplastic resin composition to exhibit a decreased moldability and degraded mechanical properties, for example, poor elongation and reduced impact strength.

The metallic fibers, for instance, brass fibers, are highly effective for imparting a high electrical conductivity to the thermoplastic resin, even when mixed in a relatively small amount compared to the carbonous fillers. However, the metallic fibers have a high specific gravity and, therefore, the resin composition containing the metallic fibers exhibits an undesirable high specific gravity.

Japanese Unexamined Patent Publication (Kokai) No. 56-72049 (1981) discloses an electrically conductive resin composition comprising a thermoplastic resin matrix and a filler consisting of a carbon powder, such as graphite powder or carbon black powder, and metallic fibers, dispersed in the matrix. In this type of electrically conductive resin composition, the electrically conductive filler must be mixed in a large amount of 20% to 30% by volume into the matrix to provide a satisfactory electrical conductivity of the resultant composition. Especially, when the amount of the metal fibers is limited to 3% to 10% by volume, the amount of the carbon powder must be more than 10% by volume, for example, from 10% to 20% by volume. This large content of the electrically conductive filler results in a poor moldability and in undesirable mechanical properties of the resultant resin composition.

SUMMARY OF THE INVENTION

An object of the present invention is to provide an electrically conductive thermoplastic resin composition containing a relatively small amount of an electrically conductive filler and having an excellent electrical conductivity and a relatively low specific gravity.

The above-mentioned object is attained by the electrically conductive thermoplastic resin composition of the present invention which comprises a matrix comprising a thermal plastic resin consisting essentially of at least one member selected from one group consisting of polyolefins, polyamides, acrylonitrile-styrene copolymer resins, acrylonitrile-styrene-butadiene terpolymer resins, polystyrene, polycarbonates, polyacetal resins, polyacrylic ester resins and polyesters and a dispersed phase consisting essentially of at least 2% by volume of metallic fibers having a diameter of from 10 to 150 microns and a length of 0.5 to 10 mm and consisting essentially of a metal selected from the group consisting of steel, stainless steel, brass, copper, aluminum and alloys of at least two of copper, aluminum, chromium, zinc, maganese and iron, and at least 2% by volume of carbon fibers uniformly dispersed in said matrix, the sum of the amounts of said metallic fibers and said carbon fibers being in the range of from 8% to 15% by volume.

DESCRIPTION OF THE PREFERRED EMBODIMENT

The resin composition of the present invention comprises a matrix comprising at least one thermoplastic resin and a dispersed phase consisting essentially of metallic and carbon fibers evenly dispersed in the matrix.

The thermoplastic resin usable for the present invention is preferably selected from polyolefins, for example, polyethylene, and poly-α-olefins such as polypropylene and polybuten-1; polyamides, for example, nylon 6, nylon 11, nylon 12, nylon 66, nylon 612, nylon 6-nylon 66 copolymers, and nylon 6- nylon 12 copolymers; acrylonitrile-styrene copolymer resins; acrylonitrile-styrene-butadiene terpolymer resins; polystyrene; polycarbonate resins; polyacetal resins, polyacrylic ester resins; and polyester resins, for example, polyethylene terephthalate.

The metallic fibers usable for the present invention preferably consist essentially of a metal selected from the group consisting of steel, stainless steel, brass, copper, aluminum, and alloys of at least two of copper, aluminum, chromium, zinc, manganese and iron.

The metallic fibers can be produced in accordance with a usual fiber-forming method, for example, a melt-spinning method, stretching method, extruding method, or shaving (cutting) method.

Preferable metallic fibers are brass fibers and aluminum fibers.

The metallic fibers have a diameter of from 10 to 150 microns, more preferably from 50 to 130 microns and a length of from 0.5 to 10 mm, more preferably from 0.5 to 6 mm.

The carbon fibers usable for present invention are selected from conventional carbon fibers, for example, carbon fibers derived from polyacrylonitrile fibers, or pitch fibers. It is preferable that the carbon fibers have a diameter of from 1 to 50 microns, more preferably from 5 to 15 microns, and a length of from 0.5 to 10 mm, more preferably from 0.5 to 8 mm.

The metallic fibers and the carbon fibers are uniformly dispersed, each in an amount of 2% by volume or more, preferably 4% by volume or more, in the thermoplastic resin matrix.

The sum of the amounts of the metallic and carbon fibers is in the range of from 8% to 20% by volume, preferably from 8% to 15% by volume.

If the content of the carbon fibers or the metallic fibers is less than 2% by volume, it is impossible to provide a resin composition which exhibits both a high electrical conductivity and a low specific gravity. Also, if the sum of the amounts of the carbon and metallic fibers is less than 8% by volume, the resultant resin composition exhibits an unsatisfactory electrical conductivity. Furthermore, if the sum of the amounts of the metallic and carbon fibers is more than 20% by volume, the resultant resin composition exhibits an unsatisfactory moldability and a shaped article derived from the resin composition exhibits decreased mechanical properties.

Usually, it is preferable that the carbon fibers in the resin composition be in an amount of less than 10% by volume but not less than 2% by volume.

The thermoplastic resin in the form of a powder can be mixed with the metallic and carbon fibers by a usual mixing method and apparatus. That is, they can be mixed with each other by a dry blending method and apparatus, or by extruding at an elevated temperature higher than the melting point of the thermoplastic resin.

The electrically conductive thermoplastic resin composition of the present invention may contain, in addition to the dispersed metallic and carbon fibers, a ususal additive, for example, pasticizer, flame retardant, foaming agent, dye, pigment, or antioxidant in a usual amount.

The electrically conductive thermoplastic resin composition of the present invention is useful for producing a wrapping or packaging material for electronic devices or parts or a shielding material for electromagnetic waves.

The electrically conductive thermoplastic resin composition of the present invention is converted into a desired shaped product by a conventional shaping method, for example, injection molding or extrusion molding.

SPECIFIC EXAMPLES

The following specific examples are presented for the purpose of clarifying the features and advantages of the present invention. However, it should be understood that those examples are intended only to illustrate the present invention and are not intended to limit the scope of the present invention in any way.

In the examples, the brass fibers used were made by Aisin Seiki Co., Japan and had a diameter of 60 microns and a length of 3 mm.

The aluminum fibers used were made by Aisin Seiki Co., Japan and had a diameter of 120 microns and a length of 3 mm.

The carbon fibers used were available under the trademark of Besphite HTA-C6S, made by Toho Beslon Co., Japan and had a diameter of 9 microns and a length of 6 mm.

EXAMPLES 1 TO 4

In each of Examples 1 to 4, a thermoplastic resin of the type and in the amount indicated in Table 1 was dry-blended with metallic fibers of the type and in the amount indicated in Table 1, and with carbon fibers in the amount indicated in Table 1.

The blend was fed into an extruder and melted at an elevated temperature. The melt was then extruded to provide pellets of the resultant resin composition.

These pellets were converted to test specimens by means of injection molding. The specimens were subjected to measurement of inherent volume resistivity and specific gravity thereof, in accordance with SRIS 2301 and ASTM.D-792, respectively.

The test results are shown in Table 1.

COMPARATIVE EXAMPLES 1 TO 3

In each of Comparative Examples 1 to 3, the same procedures as those described in Example 1 were carried out, with the following exception.

In each of Comparative Examples 1 and 2, the brass fibers and carbon fibers were used in the amounts indicated in Table 1.

In Comparative Example 3, the carbon fibers were replaced by carbon black powder available under the trademark of Ketjen Black EC made by Nippon EC Co., Japan. The test results are shown in Table 1.

TABLE 1

| | Composition | | | | | | Product | |
|---|---|---|---|---|---|---|---|---|
| | Thermoplastic resin | | Metallic fibers | | Carbon | | Inherent volume | |
| Example | Type | Amount (vol. %) | Type | Amount (Vol. %) | Type | Amount (vol. %) | resistivity $\Omega \cdot cm$ | Specific gravity |
| Example | | | | | | | | |
| 1 | Nylon 66 | 89 | Brass | 6 | Fiber | 5 | 25 | 1.61 |
| 2 | " | 91 | " | 5 | " | 4 | 60 | 1.53 |
| 3 | " | 87 | Aluminum | 6 | " | 7 | 90 | 1.28 |
| 4 | ABS(*) | 89 | Brass | 6 | " | 5 | 28 | 1.53 |
| Comparative Example | | | | | | | | |
| 1 | Nylon 66 | 92 | " | 8 | None | — | $>10^6$ | 1.72 |
| 2 | " | 90 | None | — | Fiber | 10 | $10^8$ | 1.20 |
| 3 | " | 89 | Brass | 6 | Powder | 5 | $>10^6$ | 1.61 |

Note:
(*)Acrylonitrile-butadiene-styrene (20:20:60) terpolymer resin

Table 1 clearly shows that the resin composition of Examples 1 to 4 exhibited a satisfactory electrical conductivity and specific gravity although the metallic fibers and the carbon fibers were used in the relatively small amounts of from 9% to 12% by volume. However, all the comparative resin compositions exhibited a very large volume resistivity, that is, a very poor electrical conductivity. Especially, from the comparison of Example 1 with Comparative Example 3, it is clearly indcated that the contribution of carbon fibers to the electrical conduction of the carbon fibers to the electrical conductivity of the resulting composition is surprisingly superior to that of the carbon black powder.

I claim:
1. An electrically conductive thermoplastic resin composition which comprises:
    a matrix comprising a thermoplastic resin consisting essentially of at least one member selected from the group consisting of polyolefins, polyamides, acrylonitrile-styrene copolymer resins, acrylonitrile-styrene-butadiene terpolymer resins, polysty- rene, polycarbonates, polyacetal resins, polyacrylic ester resins, and polyesters, and a dispersed phase consisting essentially of at least 2% by volume of metallic fibers having a diameter of from 10 to 150 microns and a length of from 0.5 to 10 mm and consisting essentially of a metal selected from the group consisting of steel, stainless steel, brass, copper, aluminum, and alloys of at least two of copper, aluminum, chromium, zinc, manganese and iron, and at least 2% by volume of carbon fibers uniformly dispersed in said matrix, the sum of the amounts of said metallic fibers and said carbon fibers being in the range of from 8% to 15% by volume.

2. The composition as claimed in claim 1, wherein said carbon fibers have a diameter of from 1 to 50 microns and a length of 0.5 to 10 mm.

3. The composition as claimed in claim 1, wherein said carbon fibers are contained in an amount of less than 10% by volume but not less than 2% by volume.

4. The composition as claimed in claim 1, wherein said thermoplastic resin consists essentially of polyamides.

* * * * *